United States Patent
Ross et al.

(10) Patent No.: US 8,386,125 B2
(45) Date of Patent: Feb. 26, 2013

(54) ADAPTIVE COMMUNICATION BETWEEN A VEHICLE TELEMATICS UNIT AND A CALL CENTER BASED ON ACOUSTIC CONDITIONS

(75) Inventors: Steven J. Ross, Livonia, MI (US); Richard A. Johnson, Rochester Hills, MI (US); Edward P. Chrumka, Grosse Point Park, MI (US)

(73) Assignee: General Motors LLC, Detroit, MI (US)

( * ) Notice: Subject to any disclaimer, the term of this patent is extended or adjusted under 35 U.S.C. 154(b) by 1557 days.

(21) Appl. No.: 11/562,807

(22) Filed: Nov. 22, 2006

(65) Prior Publication Data

US 2008/0119980 A1    May 22, 2008

(51) Int. Cl.
- *H04M 1/00* (2006.01)
- *H04M 1/64* (2006.01)
- *G06F 17/00* (2006.01)

(52) U.S. Cl. ........... 701/36; 701/49; 455/403; 455/63.1; 455/569.2

(58) Field of Classification Search ............. 701/1, 29, 701/30, 33, 34, 35, 36, 29.1, 29.2, 29.6, 45, 701/49, 70, 93; 455/403, 404.1, 418, 445, 455/63.1, 73, 74, 74.1, 550.1, 552.1, 556.1, 455/556.2, 557, 563, 569.1, 569.2, 570, 414.1
See application file for complete search history.

(56) References Cited

U.S. PATENT DOCUMENTS

| | | | |
|---|---|---|---|
| 6,188,315 B1 * | 2/2001 | Herbert et al. | 340/438 |
| 7,171,242 B2 * | 1/2007 | Kobayashi et al. | 455/563 |
| 7,310,521 B2 * | 12/2007 | Laghrari | 455/423 |
| 2003/0182114 A1 * | 9/2003 | Dupont | 704/233 |
| 2003/0191646 A1 * | 10/2003 | D'Avello et al. | 704/270 |
| 2005/0014487 A1 * | 1/2005 | Kobayashi et al. | 455/412.1 |
| 2006/0149457 A1 * | 7/2006 | Ross et al. | 701/117 |
| 2007/0005206 A1 * | 1/2007 | Zhang et al. | 701/36 |
| 2007/0136063 A1 * | 6/2007 | Grost et al. | 704/254 |

* cited by examiner

*Primary Examiner* — Thomas Tarcza
*Assistant Examiner* — Edward Pipala
(74) *Attorney, Agent, or Firm* — Anthony Luke Simon; Reising Ethington P.C.

(57) ABSTRACT

A method of adaptively communicating between a telematics unit of a vehicle and a call center based on acoustic conditions. A communication session is initiated between a telematics unit and a call center and vehicle sensors are monitored for acoustics-related parameters. The acoustics-related parameters are analyzed, and it is determined if one or more of the acoustics-related parameters are indicative of an unacceptably noisy condition. The communication session is established as a live communication session between the telematics unit and a live advisor at the call center, if one or more of the acoustics-related parameters are indicative of an unacceptably noisy condition.

21 Claims, 3 Drawing Sheets

ADAPTIVE COMMUNICATION BETWEEN A VEHICLE TELEMATICS UNIT AND A CALL CENTER BASED ON ACOUSTIC CONDITIONS

TECHNICAL FIELD

This invention relates to vehicle telematics and, more particularly, to automated telematics communication using automatic speech recognition (ASR).

BACKGROUND OF THE INVENTION

ASR technology enables microphone-equipped computing devices to interpret speech and thereby provide a "hands-free" alternative to conventional human-to-computer input devices such as keyboards or keypads. For example, vehicle telematics systems can be operated using ASR to provide automated services to a user.

Good performance of vehicle telematics ASR usually depends greatly on acoustic conditions such as vehicle background noise. Vehicle background noise is influenced by several factors, such as microphone position and settings, traffic, road conditions, vehicle speed, wind and rain conditions, air conditioning settings, passenger noise, and audio device settings. As one solution, ASR systems can include noise reduction algorithms. But sometimes vehicle background noises overwhelm such solutions, and ASR performance degrades to an unacceptable level. In these instances, service users can become dissatisfied with ASR-enabled telematics systems and services.

SUMMARY OF THE INVENTION

According to one aspect of the present invention, there is provided a method of adaptively communicating between a telematics unit of a vehicle and a call center based on acoustic conditions, comprising the steps of:

(a) initiating a communication session between a telematics unit and a call center;

(b) monitoring vehicle sensors for acoustics-related parameters;

(c) analyzing the acoustics-related parameters;

(d) determining if one or more of the parameters are indicative of an unacceptably noisy condition; and (e) establishing the communication session as a live communication session between the telematics unit and a live advisor at the call center if step (d) is affirmative.

The method can also include one or more of the following additional steps:

(f) establishing the communication session as an automated communication session between the telematics unit and the call center, if the step (d) determination is negative; or (g) carrying out one or more iterations of steps (b)-(d) during a previously established automobile communication session and converting the automated communication session to a live communication session at any time that the step (d) determination is affirmative.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
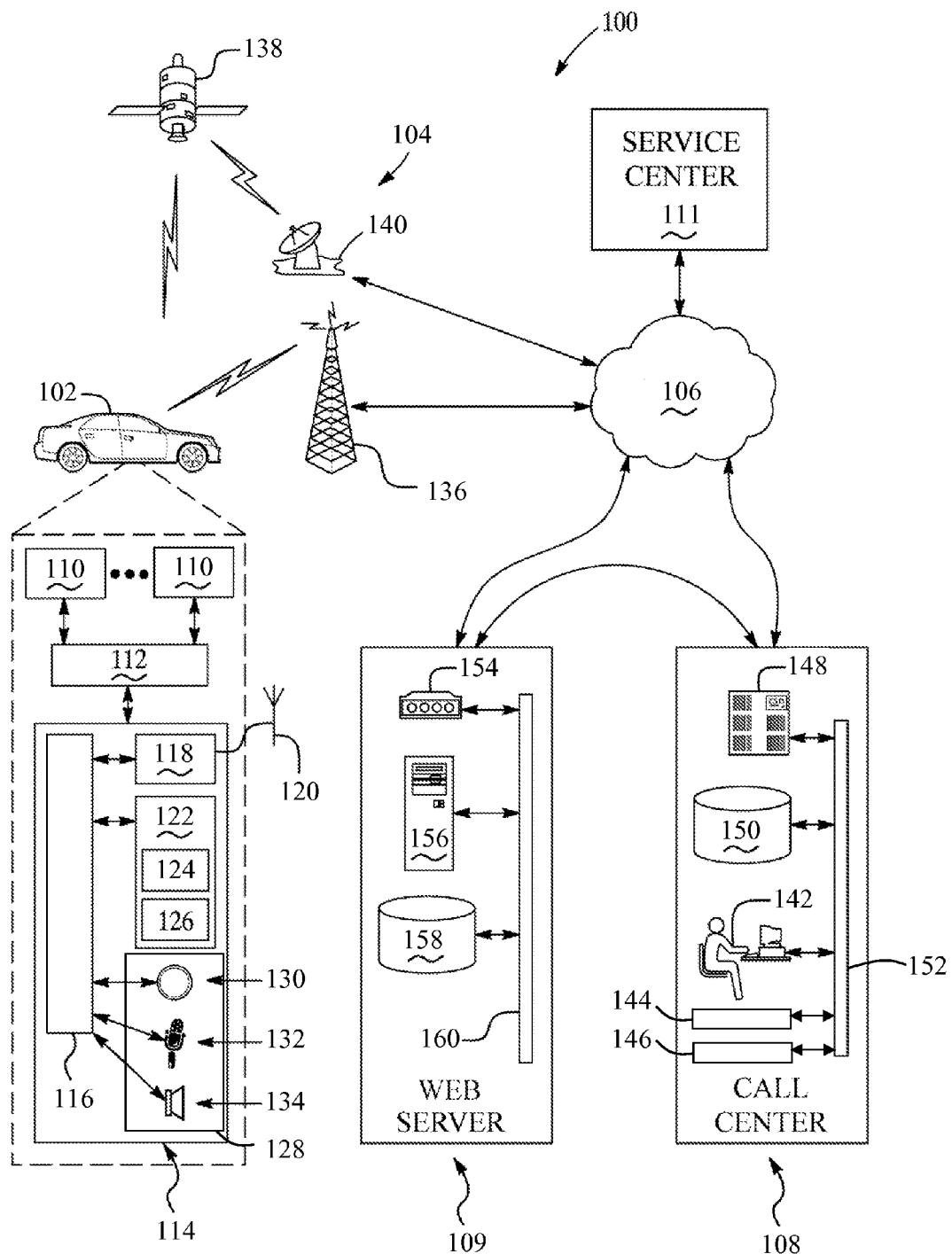
FIG. 1 is a block diagram depicting an example of a telematics system that can be used to implement exemplary methods of telematics communication.

An exemplary operating environment is illustrated in FIG. 1, and can be used to implement a presently disclosed method of adaptively communicating between a telematics unit of a vehicle and a call center based on acoustic conditions. The method can be carried out using any suitable telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a motor vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server 109 in communication with the vehicle 102 and/or the call center 108 for providing Internet services thereto. Finally, the system 100 can include a vehicle service center 111 in communication with, and providing maintenance services to, the vehicle 102.

The system 100 generally facilitates one or more suitable services for vehicle occupants such as vehicle navigation, turn-by-turn driving directions, telephony, infotainment, emergency services, vehicle diagnostics, vehicle system updates, and automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108 or the service center 111. Also, the system 100 enables electronic communication between the vehicle 102 and the web server 109 for various purposes such as transmitting and/or receiving data such as updated voice messages, email, news, Internet webpage content, or the like.

Motor Vehicle

The motor vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

VSMs

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

Vehicle Communication Bus

The vehicle communication bus 112 facilitates interactions among various vehicle systems such as the VSMs 110 and/or the telematics unit 114 and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), ISO Standard 9141, ISO Standard 11898 for high-speed applications, ISO Standard 11519 for lower speed applications, SAE Standard J1850 for high-speed and lower speed applications, and/or a wireless area network.

Vehicle Telematics Unit

The vehicle telematics unit 114 facilitates communication and other services between the vehicle 102 or occupants thereof, and various remote locations including the call center 108, web server 109, and/or service center 111. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown here, or could omit some of the components shown here.

Telematics Processor

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of communicating between a telematics unit of a vehicle and a call center, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

Telematics Memory

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of communicating between a telematics unit of a vehicle and a call center. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

Telematics Communications Device

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and data communication and data-over-voice communication, wherein both voice and data signals can be sent and received over a voice channel. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used.

The communications device 118 can include any suitable modules including a satellite receiver and software, and/or cellular communications software and hardware such as a wireless modem and/or an embedded cellular telephone. The cellular telephone can be analog, digital, dual mode, dual band, multi-mode, and/or multi-band, and can include a separate processor and memory. Moreover, the cellular telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104. Although shown as a separate component, communication device 118, or portions thereof, can be implemented through software using microprocessor 116; for example, a modem used for wireless cellular communication can be implemented in this manner.

The communications device 118 can also include a global positioning system (GPS) module including communication and signal processing software and equipment, which can be separate from or integrated with the telematics device 114. For example, such a GPS module receives location and time data from the wireless communication system 104 and conveys corresponding latitude and longitude information to the telematics unit 114 to enable the telematics unit 114 to process, store, and send location information to carry out services such as navigation, driving directions, and emergency services.

The communications device 118 can further include a satellite communications module including signal processing software and equipment, which can be separate from or integrated with the telematics device 114. For example, the satellite communications module receives satellite radio broadcast signals over one or more channels from one or more geostationary satellites of a satellite service provider, and generates corresponding audio and/or data output. In addition to music and entertainment, traffic information, road construction information, advertisements, news and information on local events, satellite broadcasts can also include messages. Satellite radio broadcast signals received by the satellite communications module can be monitored for signals with targeted information, and when the targeted information is detected, the targeted message and associated information can be extracted from the broadcast signal.

Telematics User Interface

The telematics user interface 128 includes one or more input and output interfaces to receive input from, and transmit output to, vehicle occupants. As used herein, the term user includes telematics service subscribers and customers, vehicle occupants such as drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), infotainment center, or the like. Infotainment centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or cellular telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal or plasma screen (not shown), or any other types of output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108, web server 109, and/or service center 111 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108, web server 109, and/or service center 111. The cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or programs running on a computer operatively disposed to respond to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 further includes one or more communication service managers 146, one or more servers 148 to process data, one or more suitable databases 150 to store user data and any other suitable data, and one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of communicating between a telematics unit of a vehicle and a call center, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Web Server

The integration of the web server 109 with the system 100 enables vehicle occupants to interact with websites and other content from the Internet, for example, by using automatic speech recognition technology and text-to-voice technology such as VoiceXML, or the like. For example, vehicle occupants can use the telematics unit 114 and embedded speech recognition to ask for information such as by vocalizing a command like "weather" or by speaking a nametag associated with a particular website address. The speech recognition technology recognizes the command or nametag and translates the request into suitable web language such as XML (Extensible Markup Language), and/or associates the request with a stored user profile to correlate the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupants via the user interface 128.

The web server 109 is implemented using one or more computer servers in any suitable location(s) such as at the call center 108 or an independent remote location. The exemplary web server 109 includes a suitable communication interface 154 such as a modem, switch, and/or router, a computer 156, and a database 158 all connected by any suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158. The web server 109 also communicates with the call center 108 and/or the service center 111 such as via the second communication system 106 or a more direct path. Suitable server hardware and software configurations are known to those skilled in the art.

Service Center

The service center 111 can be a vehicle service center where vehicle diagnosis, maintenance, and repair can be carried out. The service center 111 can be a vehicle dealership, automotive repair shop, or the like. The service center 111 is in communication with the vehicle 102 such as via the communication system so that vehicle occupants can, for example, initiate a telephone call with a sales or service representative at the service center 111.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
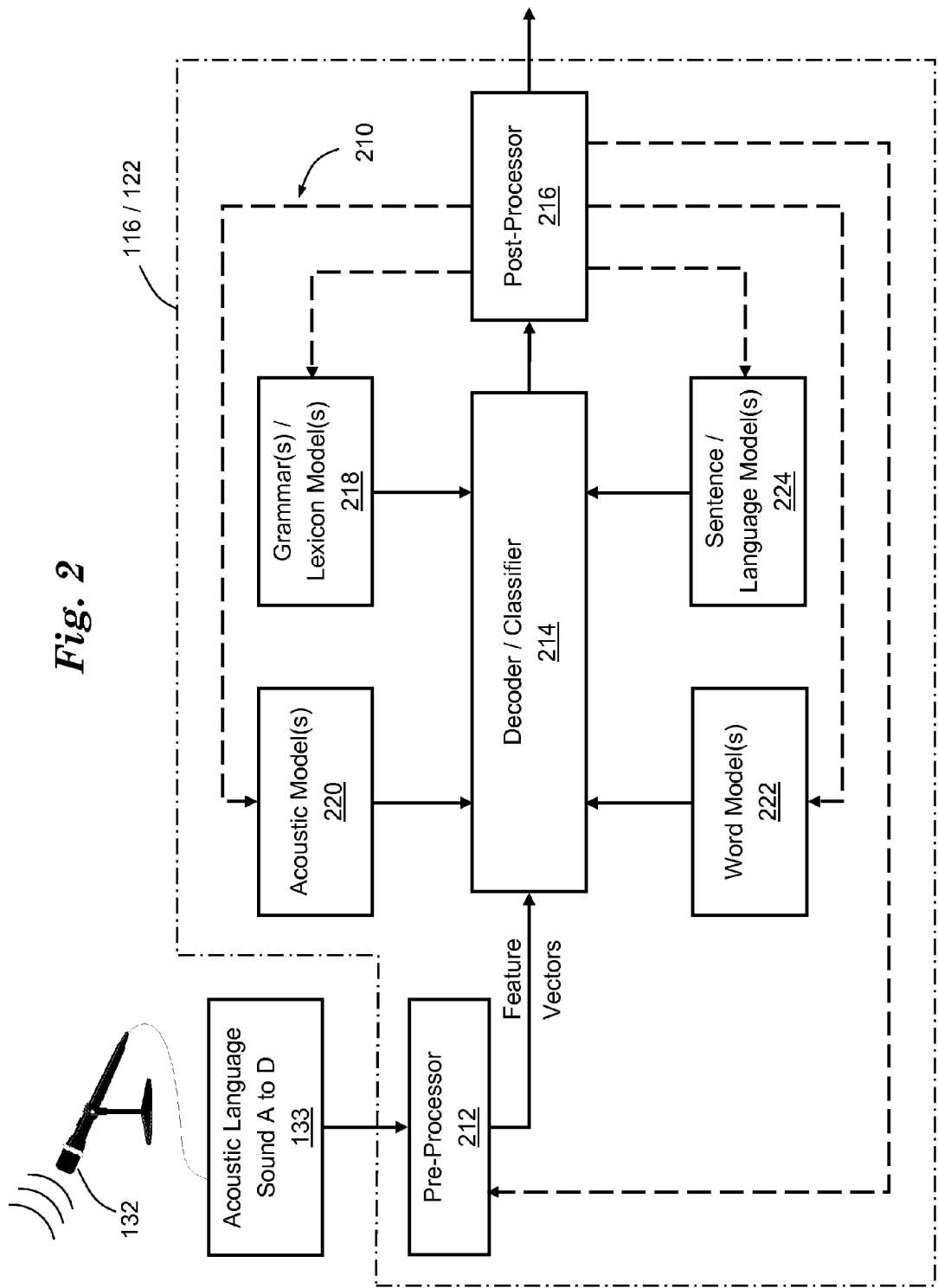
FIG. 2 is a block diagram illustrating an example ASR architecture that can be embedded within the telematics system of FIG. 1 and used to implement exemplary telematics communication methods.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar or lexicon model(s) 218 can provide rules governing which words can logically follow other words to form valid sentences. In a broad sense, a grammar defines a universe of vocabulary the system 210 expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) 224 can define a universe of sentences the system 210 expects at any given time in any given ASR mode, and/or can provide rules governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

Extracting Acoustic Data

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Decoding

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem. A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Post-Processing

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

Method of Telematics Communication

Figure 3:
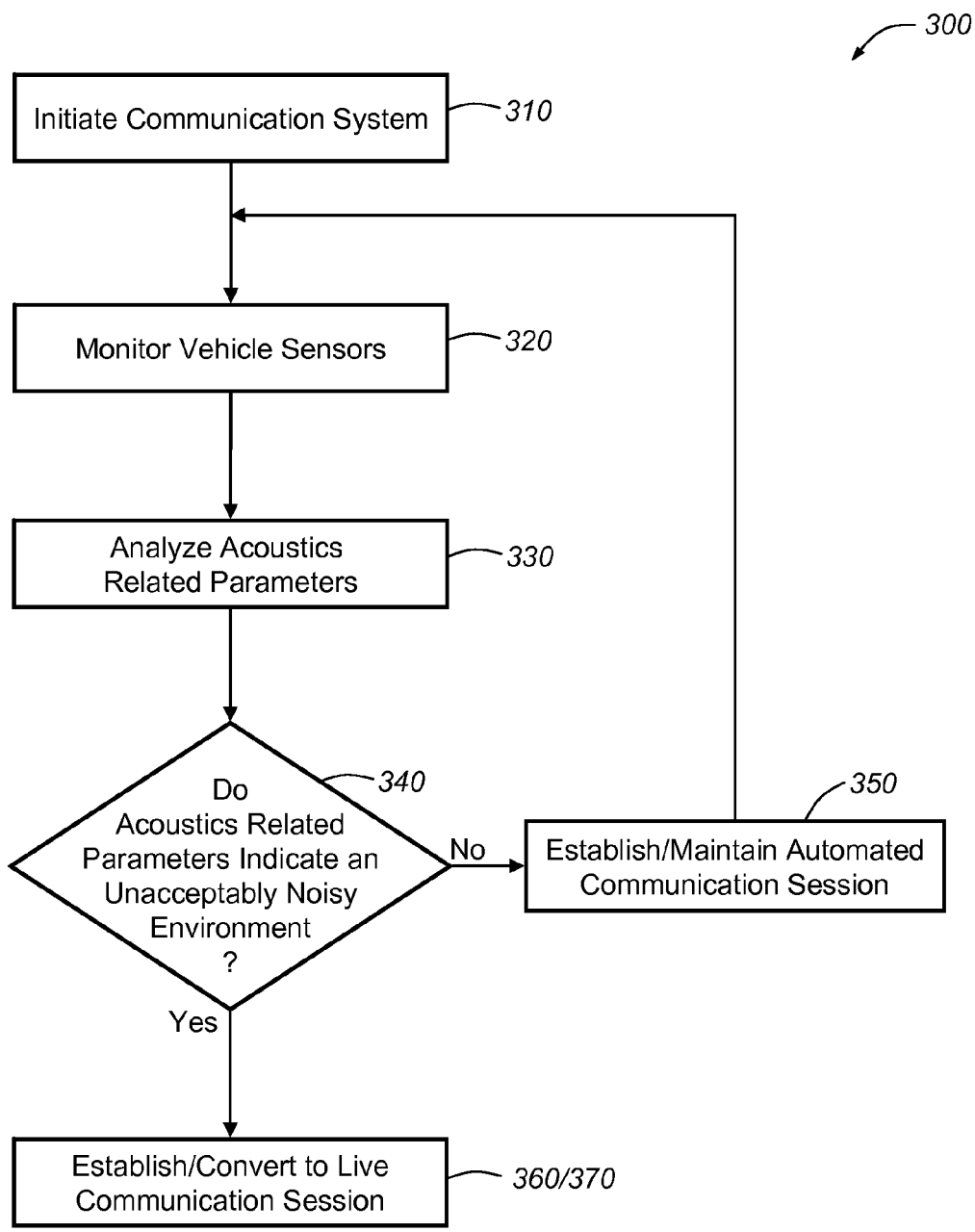
FIG. 3 is a flow chart of an embodiment of an exemplary telematics communication method that can be performed using the exemplary telematics system and ASR architecture of FIGS. 1 and 2.

FIG. 3 illustrates an exemplary method 300 of adaptively communicating between a telematics unit of a vehicle and a call center based on acoustic conditions. The method 300 can be carried out as one or more computer programs using the architecture of the ASR system 210 within the operating environment of the telematics system 100 described above. Those skilled in the art will also recognize that the method 300 can be carried out using other ASR systems within other operating environments.

In general, the exemplary method 300 is provided to improve user satisfaction with communication sessions of telematics systems. Communication sessions are often automated to provide users with value in the form of speedy, low cost, high quality services. But sometimes automated communication sessions are impracticable because noise in a vehicle is so high that it produces unreliable results from automated speech recognition engines. In such situations, user satisfaction can be improved by directing users away from automated communication to live communication with a live advisor who can do a better job of filtering out high levels of noise to accurately recognize the user's speech. The method 300 is used to place the vehicle caller into an automated communication session when acoustic conditions are favorable and to connect the caller to a live advisor if not.

At step 310 of the method 300, a communication session between a telematics unit and a call center is initiated in any suitable manner. For example, the communication session can be initiated from the telematics unit to the call center responsive to user input. More particularly, the communication session can be initiated when a user places a service call to the call center using the telematics unit such as by pressing a button on the user interface of the telematics unit. Communication sessions can include service activation calls, user service inquiries, billing communications, and any other call between a user and a call center. The communication session can be initiated for human-to-human communication between a user in the vehicle and a live advisor at the call center in a live communication session, or for human-to-machine communication between a user in the vehicle and an automated system, which can be resident in the vehicle, at the call center, or both. As used herein, the automated system can include any suitable ASR-enabled telematics services, such as menu-based services like automated wireless replenishment services wherein users can purchase telematics air time, automatic voice destination services wherein users can receive vehicle navigation services, automated telematics system demonstration services, and the like.

At step 320, vehicle sensors are monitored for acoustics-related parameters in any suitable manner. There are various conditions that can affect the noise level within a vehicle. Exemplary conditions can include vehicle road noise, engine noise, fan noise of an interior climate control system, vehicle radio volume, turn signal noise, vehicle alarms like seatbelt or door chimes, and/or external conditions like rain, wind, or thunder to name but a few. Such conditions can be evaluated with acoustics-related parameters because of their relationship to acoustics in the vehicle and concomitant effect on ASR performance. One exemplary acoustics-related parameter is a signal-to-noise ratio (SNR).

SNR is an excellent parameter, but may not be optimal in all conditions. For example, a user can initiate a communication session for automated services while the vehicle is quietly at a stop at a red traffic light—but with all of the windows down and the sunroof open. In such a case, if SNR was the only monitored parameter, then the communication session would likely be established as an automated session. But once the traffic light turns green and the vehicle accelerates, wind and engine noise may render the automated communication session impracticable.

Therefore, as used herein, acoustics-related parameters can include any suitable parameters such as vehicle speed, engine speed, fan speed, windshield wiper state, windshield wiper speed, window or sun roof state, window or sun roof relative opening, seatbelt connection state, door opening/closed state, radio volume, microphone signal-to-noise ratio, or the like. As also used herein, vehicle sensors can include any suitable devices such as vehicle speed sensors, engine speed sensors, fan switches, radio switches, turn signal switches, seatbelt or door switches, windshield wiper switches, rain or wind sensors, sun roof switches, window switches, microphones, vehicle system modules (VSMs), or any other sensors, switches, circuits, or software. For example, vehicle systems can be designed to operate using software algorithms to test impedance or any other suitable parameter of an electrical circuit or electronics of a device to determine a condition of the device, to assess whether the device is operating, or the like. In other words, the terminology "vehicle sensors" is to be broadly construed as anything that can be used in monitoring or determining acoustics-related parameters.

At step 330, the acoustics-related parameters from step 320 are analyzed in any suitable manner. In a first example, individual values of the acoustics-related parameters can be compared to corresponding threshold values. As used herein, parameter values can include any suitable values, numerical or otherwise, such as the following exemplary parameter values: windshield wiper on or off, high, medium, low, intermittent, or the like windshield wiper speeds; open or closed window or sun roof, opening percentage, opening distance, or the like for windows or sun roofs; signal-to-noise ratio values, or the like. In one exemplary embodiment, a monitored sun roof opening percentage (e.g., 50% open) can be compared to a threshold sun roof opening percentage of 30%. In a second example, the acoustics-related parameter values can be combined with one another in any suitable manner and analyzed using formulas, algorithms, weighting schemes, or the like.

At step 340, it is determined if one or more of the acoustics-related parameters are indicative of an unacceptably noisy environment. As used herein, an unacceptably noisy environment can include a vehicle interior acoustic level that does yield or can yield an unacceptably low speech recognition rate. For example, an unacceptably noisy environment can be indicated by one or more individual values of the acoustics-related parameters exceeding one or more corresponding threshold values. In one exemplary embodiment, if the monitored sun roof opening percentage, e.g. 50%, exceeds the corresponding sun roof opening threshold opening percentage, e.g. 30%, then it is determined that the sun roof parameter is indicative of an unacceptably noisy environment.

If unacceptably noisy conditions are not determined to be present at step 340, then the process moves to step 350 where the communication session is established as an automated communication session between the telematics unit and the call center. For example, the automated communication session can include the telematics unit communicating with one or more automatons or programs running on a call center computer. Such automated communication sessions can also include menu driven processes, and the like. After step 350, the method proceeds back to step 320 for continued monitoring through a loop defined by steps 320 through 350. As long as the acoustic conditions are determined at step 340 to be favorable, the process will continue to loop through steps 320-350 and maintain the communication session as an automated session.

If the step 340 determination is affirmative (i.e., an unacceptably noisy environment exists), then at step 360 the communication session is established as a live communication session between the telematics unit and a live advisor at the call center. For example, after the communication session is initiated, but before the telematics system enters an automated communication session, the step 340 determination can be made and, if affirmative, the communication session can be live instead of automated. Live and automated communication session techniques and protocols are known to those of ordinary skill in the art.

At step 370, a previously established automated communication session can be converted to a live communication session if the step 340 determination is affirmative. In other words, if an automated communication session is already in progress, such as a session established in step 350 or otherwise, and the environment is thereafter determined to be unacceptably noisy, then that session can be interrupted and the user routed instead to a live advisor using a live communication session.

As discussed above, the determination of whether an unacceptably noisy environment exists can be determined by comparing one or more acoustic-related parameters with a suitable threshold value for each parameter. For this purpose, the thresholds can be static values that are predefined for the particular vehicle model and/or vehicle options, or as part of an initial setup of the telematics and/or ASR system. Alternatively, the thresholds can be periodically updated by, for example, an adaptive adjustment of their values based on a determined recognition accuracy for one or more automated communication sessions. The recognition accuracy can be determined by, for example, calculating the percentage of recognitions that were successful (e.g., 80%). Thus, for example, if the system enters into an automated communication session and then has a high rate of misrecognition of user speech input (i.e., a low recognition accuracy), then the relevant thresholds can be adjusted to increase the likelihood that similar conditions will result in a live communication session and not an automated one. Conversely, if the recognition accuracy of user speech is determined to be very high while in the automated communication session mode, then one or more of the thresholds can be adjusted in the opposite direction so that the user will be placed into an automated communication session even if subsequent acoustic environmental conditions are somewhat worse. These adjustments can occur each time an iteration of the process of FIG. 3 is carried out, or only after a certain number of iterations in which similar determinations were made (e.g., after 3 three iterations in which each had a low recognition accuracy). Techniques for adaptively updating the thresholds are known to those skilled in the art.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of adaptively communicating between a telematics unit of a vehicle and a call center based on acoustic conditions, comprising the steps of:
    (a) initiating a communication session between a telematics unit and a call center;
    (b) monitoring vehicle sensors for acoustics-related parameters;
    (c) analyzing the acoustics-related parameters;
    (d) determining if one or more of the acoustics-related parameters are indicative of an unacceptably noisy condition; and (e) establishing the communication session as a live communication session between the telematics unit and the call center, if the step (d) determination is affirmative.

2. The method of claim 1, further comprising the step of (f) establishing the communication session as an automated communication session between the telematics unit and the call center, if the step (d) determination is negative.

3. The method of claim 1, further comprising the step of (g) carrying out one or more iterations of steps (b)-(d) during a previously established automated communication session and converting the automated communication session to a live communication session at any time that the step (d) determination is affirmative.

4. The method of claim 1, further comprising the step of (g) carrying out one or more iterations of steps (b)-(d) during a previously established automated communication session and maintaining the communication session as an automated communication session if the step (d) determination is affirmative.

5. The method of claim 1, wherein the acoustic-related parameters of the monitoring step (b) include at least one of vehicle speed, engine speed, fan speed, windshield wiper state, windshield wiper speed, seatbelt connection state, door opening/closed state, radio volume, window state, sun roof state, window relative opening, sun roof relative opening, or microphone signal-to-noise ratio.

6. The method of claim 1, wherein the analyzing step (c) includes comparing values of the acoustics-related parameters to threshold values.

7. The method of claim 6, further comprising the step of periodically updating one or more of the threshold values.

8. The method of claim 7, wherein the updating step further comprises the step of determining a recognition accuracy during one or more automated communication sessions and updating at least one threshold value in response to the determined recognition accuracy.

9. The method of claim 6, wherein it is determined in step (d) that one or more of the acoustics-related parameters are indicative of an unacceptably noisy condition, if one or more of the values of the acoustic-related parameters exceeds one or more of the threshold values.

10. A method of adaptively communicating between a telematics unit of a vehicle and a call center based on acoustic conditions, comprising the steps of:
   (a) initiating a communication session between a telematics unit and a call center;
   (b) monitoring vehicle sensors for acoustics-related parameters, which include at least one of vehicle speed, engine speed, fan speed, windshield wiper state, windshield wiper speed, seatbelt connection state, door opening/closed state, radio volume, window state, sun roof state, window relative opening, sun roof relative opening, or microphone signal-to-noise ratio;
   (c) analyzing the acoustics-related parameters by comparing values of the acoustics-related parameters to threshold values;
   (d) determining if one or more of the acoustics-related parameters are indicative of an unacceptably noisy condition, wherein the determination is affirmative if one or more of the values of the acoustic-related parameters exceeds one or more of the threshold values;
   (e) establishing the communication session as a live communication session between the telematics unit and the call center, if the step (d) determination is affirmative;
   (f) establishing the communication session as an automated communication session between the telematics unit and the call center, if the step (d) determination is negative; and
   (g) carrying out one or more subsequent iterations of steps (b)-(d) and converting a previously established automated communication session to a live communication session at any time that the step (d) determination is affirmative.

11. The method of claim 10, further comprising the step of updating one or more of the threshold values by determining a recognition accuracy during one or more automated communication sessions and adjusting at least one threshold value in response to the determined recognition accuracy.

12. A method of adaptively communicating between a telematics unit of a vehicle and a call center based on acoustic conditions, comprising the steps of:
   (a) monitoring vehicle sensors for acoustics-related parameters;
   (b) analyzing the acoustics-related parameters;
   (c) determining if one or more of the acoustics-related parameters are indicative of an unacceptably noisy condition; and
   (d) establishing a live communication session between the telematics unit and the call center, if the step (c) determination is affirmative.

13. The method of claim 12, wherein the acoustic-related parameters of the monitoring step (a) include at least one of vehicle speed, engine speed, fan speed, windshield wiper state, windshield wiper speed, seatbelt connection state, door opening/closed state, radio volume, window state, sun roof state, window relative opening, or sun roof relative opening.

14. The method of claim 12, wherein the acoustic-related parameters of the monitoring step (a) include microphone signal-to-noise ratio.

15. The method of claim 12, further comprising the step of carrying out one or more iterations of steps (a)-(c) during a previously established automated communication session and converting the automated communication session to the live communication session at any time that the step (c) determination is affirmative.

16. The method of claim 12, further comprising the step of carrying out one or more iterations of steps (a)-(c) during a previously established automated communication session and maintaining the communication session as an automated communication session if the step (c) determination is affirmative.

17. The method of claim 12, wherein the analyzing step (b) includes comparing values of the acoustics-related parameters to threshold values.

18. The method of claim 17, further comprising the step of periodically updating one or more of the threshold values.

19. The method of claim 18, wherein the updating step further comprises the step of determining a recognition accuracy during one or more automated communication sessions and updating at least one threshold value in response to the determined recognition accuracy.

20. The method of claim 17, wherein it is determined in step (c) that one or more of the acoustics-related parameters are indicative of an unacceptably noisy condition, if one or more of the values of the acoustic-related parameters exceeds one or more of the threshold values.

21. A method of adaptively communicating between a telematics unit of a vehicle and a call center based on acoustic conditions, comprising the steps of:
   (a) monitoring vehicle sensors for acoustics-related parameters;

(b) analyzing the acoustics-related parameters;
(c) determining if one or more of the acoustics-related parameters are indicative of an unacceptably noisy condition; and
(d) converting an automated communication session between the telematics unit and the call center to a live communication session between the telematics unit and the call center, if the step (c) determination is affirmative.

* * * * *